United States Patent [19]

Burch

[11] 3,987,308

[45] Oct. 19, 1976

[54] PEAK LOAD CONTROL ENERGY SAVING AND CYCLING SYSTEM

[75] Inventor: John Burch, Seattle, Wash.

[73] Assignee: Controlled Energy Systems Co., Seattle, Wash.

[22] Filed: June 16, 1975

[21] Appl. No.: 586,965

[52] U.S. Cl. .................................. 307/41; 307/52
[51] Int. Cl.² ......................................... H02J 3/14
[58] Field of Search ................. 307/41, 38, 39, 52, 307/57, 85, 86, 87; 235/151.21

[56] References Cited
UNITED STATES PATENTS

| | | |
|---|---|---|
| 3,659,114 | 4/1972 | Polenz et al. .................... 307/52 |
| 3,769,520 | 10/1973 | Carrington ........................ 307/41 |

Primary Examiner—Herman J. Hohauser

[57] ABSTRACT

Control system for limiting peak load demand and/or saving electrical energy by cycling the individual loads within an electrical distribution system. Electrical power usage in a distribution system is continuously monitored and compared to a pre-set limit. Loads can be added and cycled according to a limit set by the operator. Loads can also be dropped in response to a signal proportional to the electrical power usage in a distribution system within limits defined by the operator.

10 Claims, 5 Drawing Figures

| | T | T+3 | T+6 | T+9 | T+12 | T+15 | T+18 | T+21 | T+24 |
|---|---|---|---|---|---|---|---|---|---|
| LOAD 1 | ON | OFF | OFF | OFF | ON | ON | ON | ON | ON |
| LOAD 2 | ON | ON | OFF | OFF | OFF | ON | ON | ON | ON |
| LOAD 3 | ON | ON | ON | OFF | OFF | OFF | ON | ON | ON |
| LOAD 4 | ON | ON | ON | ON | OFF | OFF | OFF | ON | ON |
| LOAD 5 | ON | ON | ON | ON | ON | OFF | OFF | OFF | ON |
| LOAD 6 | OFF | ON | ON | ON | ON | ON | OFF | OFF | OFF |
| LOAD 7 | OFF | OFF | ON | ON | ON | ON | ON | OFF | OFF |
| LOAD 8 | OFF | OFF | OFF | ON | ON | ON | ON | ON | OFF |

PEAK LOAD CONTROL ENERGY SAVING AND CYCLING SYSTEM

BACKGROUND OF THE INVENTION

The invention relates to a system for limiting peak loads in electrical systems and for saving on electrical consumption. More particularly does it relate to an electrical load limiting and load cycling system in which the power usage is continuously monitored and compared to a preset limit. In response to the results of this comparison the device will either add the connected loads until the maximum permissible power usage rate is reached or until the maximum permissible number of loads are added. The device may take no action and remain with the same number of "on" loads or it will drop loads until the power usage rate has been lowered to below the maximum permissible rate or until the maximum permissible number of loads have been dropped.

As is well known by customers of electrical utilities, the customer is often charged by the electric company according to the maximum demand for electrical energy over a billing period. A maximum demand meter is installed on the customer's premises for recording the maximum electrical energy consumed during that time interval. Throughout days and seasons peak loads vary. Some of the loads causing these peaks are known to the customers while others cannot be predicted. Despite the large variation in the demand it is advantageous to the user to maintain the peak load below a predetermined limit. Such a condition for the customer has a billing advantage while the electrical utility is enabled to provide a more adequate service to all its customers.

A number of systems have been devised to deal with the limiting of peak load demands. Some, in order to limit peak demand, sequentially switch loads. One of the obvious requirements of such a system is that the loads to be shed, particularly lower priority loads, are of little importance or value when one considers the benefits of the service rendered by such loads. In fact, it is generally recognized that very few loads fall into this category.

Systems have also been devised to turn loads off in response to the anticipated power usage in synchronization with the power utility demand. Such a system has a tendency to shed a maximum of loads towards the end of the demand period and no loads at the beginning of the demand period. Not only is this relatively rapid change of loads frequently annoying to the consumer, but it is also objectionable to the power utility as it causes periodic power surges on their lines.

Other systems cycle loads off in response to the actual power being used, but no provision is made to limit the maximum number of stages or loads off. Thus, in such systems and at periods of peak demand, all loads will be shut off. Additionally, there is no provision to limit the minimum number of stages or loads off as a result of which the consumer does not take advantage of the potential savings inherent in maintaining a portion of their loads off at all times.

Among the prior art references to be considered are U.S. Pat. Nos. 3,489,913; 3,566,078; 3,714,453; and 3,769,520. None of the four references cited is particularly pertinent to this invention.

SUMMARY OF INVENTION

The present system employs decision circuit in which an input signal proportional to the instantaneous rate of power usage is compared to a pre-selected set point value. The decision circuit outputs signals to a counter gating circuit which indicate that loads are to be added, dropped, or not to be changed. The up or down signals are fed from the counter gating circuit and directed to an up-down counter and the binary code output from the up-down counter is then fed to the input of a decimal decoder. The decimal decoder converts the binary signal at its input and switches to its numerically corresponding output with a logic zero signal. The outputs of the decimal decoder are connected to a nand gate circuit and thence to a cycler shift register. Disposed between the nand gate circuit and cycler shift register are a pair of switching means one of which is able to select the number of loads which will always be off in the system. The other switching means can select the maximum number of loads that will be off in the system at any one time. The counter gating circuit system enables the up-down counter to receive clock pulses in response to signals from the decision circuit but within the limits defined by the maximum and minimum "off" load switches.

Accordingly, it is among the many features and advantages of the invention to provide a peak load limiter and cycler which introduces substantial energy savings into a multiple load electrical system such as in office buildings having many types of energy consuming loads. The system gives more control to operators since the range can be set within which the system is to operate both with respect to peak load demands and with respect to energy saving. The system is reasonably inexpensive, reliable and utilizes solid state electrical technology. Limits can be set into the system so that not all the loads are on or off at one time. In this way, the system can set the minimum number of loads that will always be off as well as select and determine the maximum number of loads that will be off at any give time. The system does not limit itself with respect to the beginning or the end of a peak demand period. In this system, because of the energy equalizing and cycling capability, no load is off for more than a relatively short period of time.

DESCRIPTION OF PREFERRED EMBODIMENTS

Figure 1:
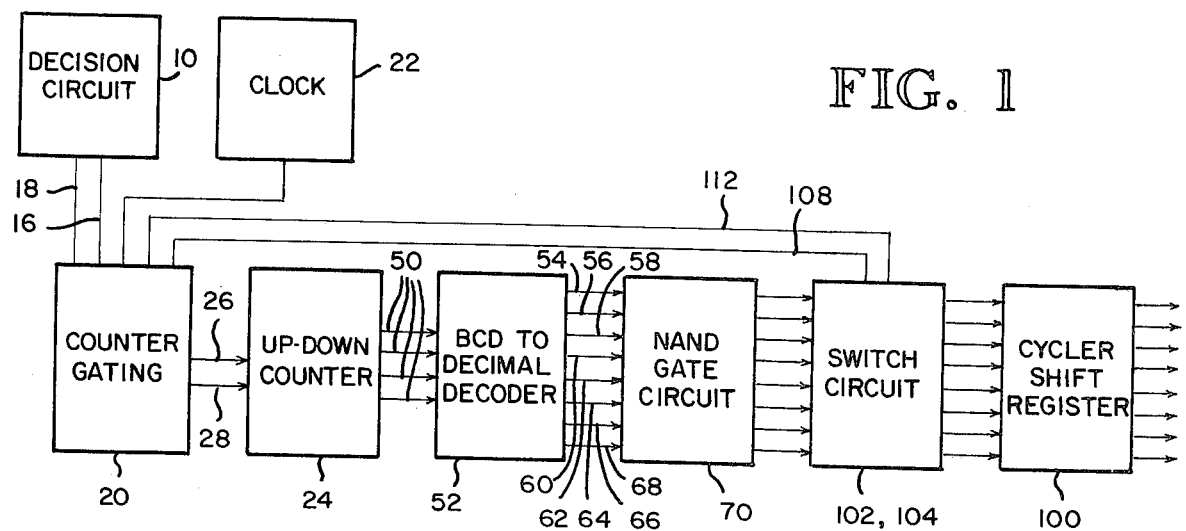
FIG. 1 is a block diagram schematic showing the principal subcircuit sections of the system.
Figure 2:
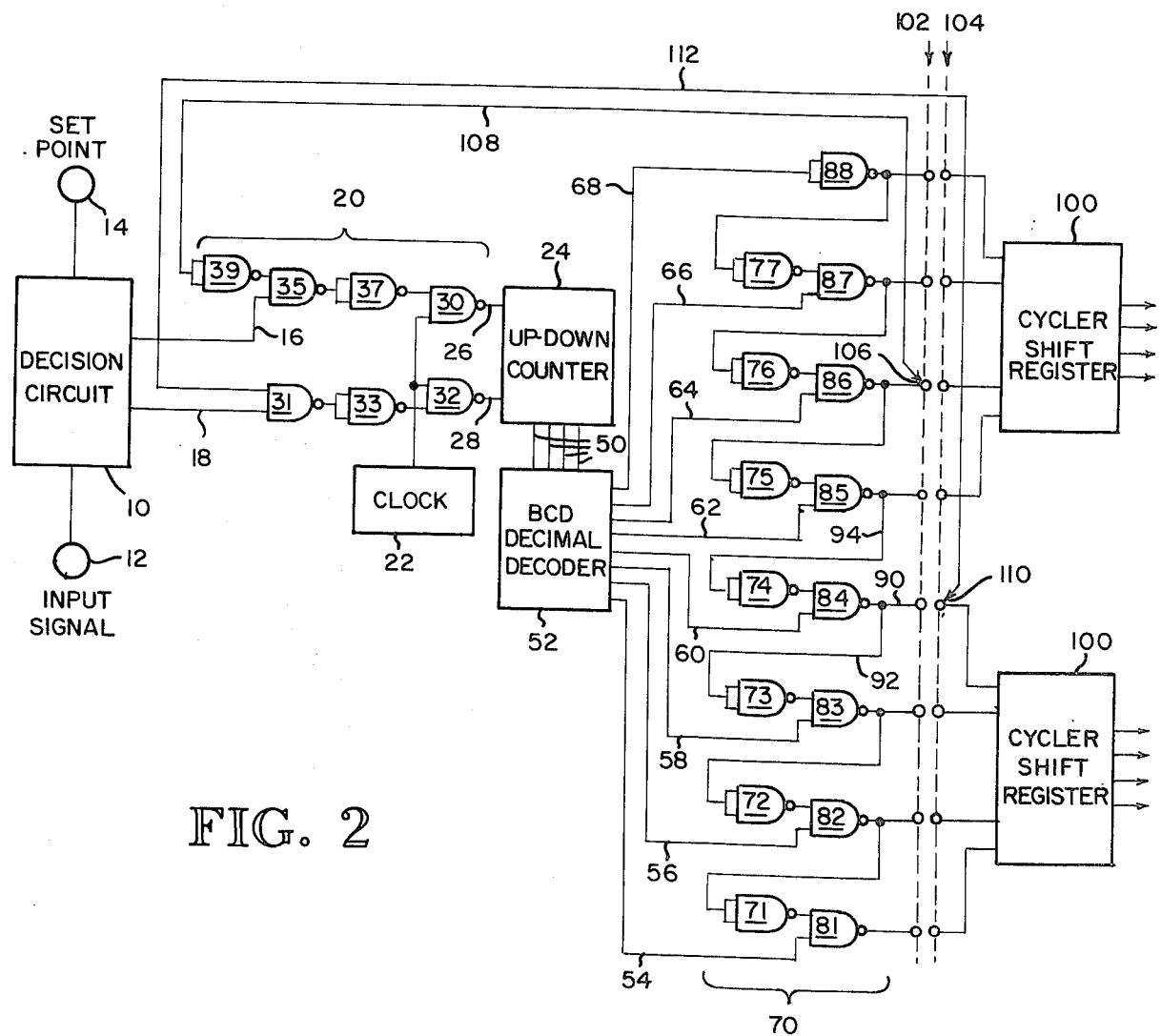
FIG. 2 is an electrical schematic showing additional circuit details with respect to the block diagram of FIG. 1.

Referring now to the drawings and particularly to FIGS. 1 and 2, it will be seen that this system includes a decision circuit 10 which tells the system whether it is to add loads, drop loads, or make no change in the number of "on" loads. The decision circuit 10 receives a pulse rate proportional to the instantaneous rate of powr usage in the form of a signal source 12 which could be obtained directly from the electric power utility meter or an equivalent device. The demand rate from source 12 is compared with set point 14 in the decision circuit 10 and as a result the decision circuit outputs an "add" load signal on line 16 or a "shed" load signal on line 18. Obviously, if the input signal is higher than the set point then the decision output will be a shed load signal. If the input signal is less than the set point value then the output signal will be to add a load. It should be noted that a dead band range is provided for, so that the input pulse rate from the source 12 must be below the set point value by a predetermined amount before there will be an output signal to add a load. Thus, within the dead band the output will be a "do nothing" signal.

The output from the decision circuit 10 is received in up-down counter 24 through lines 26 and 28. A counter gating circuit 20 is disposed between the control system. Clock 22 in connected to nand gates 30 and 32 in the gating circuit so that periodic pulses, for instance very three minutes, may be permitted to pass through to the counter 24 to increment or decrement the up-down counter as commanded by the decision circuit. Nand gates between gates 30 and 32 and the decision circuit to be more fully discussed hereinafter, determine whether or not pulses from clock 22 will be enabled to pass to counter 24. Accordingly, if there is a logic one on the input side of nand gate 30 or 32 the clock pulse will increment counter 24 up and down. Binary code output from counter 24 is fed via lines 50 to BCD (Binary Coded Decimal) to decimal decoder 52. Decoder 52 has output lines 54 through 68 corresponding with the number of loads controlled by the system such as is shown by way of example only to be eight loads. Decoder 52 accepts the binary signal from the counter 24 to switch the corresponding or matching numerical output to logic zero. Only one of the numerical outputs from decoder 52 can be at logic zero at any one time. Thus for instance, decoder output number four may be switched to logic zero indicating that out of the eight controlled loads four are to be on. It will be understood that as the binary number at its input 50 increases so the output of the decoder 52 is shifted along (up and down) from one output to the other depending upon the signals coming to it from the decision circuit. Output lines 54 through 68 corresponding to output numbers 1 through 8 in the decoder are connected to nand gate circuit 70.

As mentioned above, only one of the outputs from the decoder can be a logic zero at any one time. The remainder of the outputs are at logic one. The nand gate circuit 70 inverts the single logic zero signal to logic one. For instance, if the decoder outputs a logic zero at output number 4 on line 60, nand gate 84 inverts the logic zero to a logic one at the output 90 of gate 84. The logic one is fed via line 92 to the inverter stage nand gate 73 of the next lower ranking stage, wherein nand gate 73 outputs a logic zero to the input of nand gate 83. Even though output three, line 58 is at logic one to the input side of nand gate 83 the output of gate 83 is at a logic one. It will be seen that all of the outputs of the nand gate circuit of lower rank than the activated input are forced to logic one. Line 68 from output eight of the decoder inputs the logic one to gate 88 which in turn outputs a logic zero. Logic zero is fed via line 89 to the input side of inverter stage nand gate 77 which in turn outputs a logic one to gate 87. This logic one plus the logic one from output 7 of the decoder forces a logic zero on the output of nand gate 87. In this way, all outputs of higher rank than the activated input gate 84 are at logic zero. The output states from nand gates 81 through 88 are used to program the cycler shift register circuit 100 which in turn energizes and cycles the controlled loads in the system.

In order to further control the number of energized loads two switches are provided, one of which sets the number of loads which will always be off and a second switch which determines the maximum number of loads which may be off at any one given time. For instance, the first switch 102 sets the number of loads that are always held off. Outputs 1 through 8 of decimal decoder 52 go through the nand gate circuit 70 to one contact of each of switches 102 and 104. Pole 106 of minimum off switch 102 is connected via line 108 to the input of nand gate 39. Nand gate 39 is used as an inverter stage for the signal to nand gate 35 also connected by line 16 to decision circuit 10. The output of nand gate 35 in turn is fed to nand gate 37 used as an inverter the output of which is fed to nand gate 30 which is also connected to clock 22. In like manner, switch 104 has pole 110 which is connected by line 112 to nand gate 31 also receiving input from decision circuit 10. The output of gate 31 is fed to gate 33 used as in inverter which in turn outputs to nand gate 32 also connected to clock 22.

In operation counter gating circuit 20 enables the up-down counter 24 to receive clock pulses in response to the signals from the decision circuit but within the limits defined by switches 102 and 104. The counter gating circuit 20 enables the up-down counter 24 to count up when an up signal is received from the decision circuit 10 until the pole 106 of switch 102 goes to a logic one. When the pole 106 of switch 102 goes to logic one additional "up" pulses are inhibited. For example, if the decision circuit 10 should order the energization of loads the minimum off switch being set at three will inhibit the system from energizing more than five of the eight loads controlled by the system. When the up-down counter increments to five, decoder 52 will output at position five a logic zero via line 62 to nand gate 85. A logic one will output to the pole of switch 102 via line 108 to the inverter stage nand gate 39. Inverter gate 39 outputs a logic zero to nand gate 35. This results in a logic one to nand gate 37. Nand gate 37 in turn outputs a logic zero to nand gate 30 which inhibits additional "up" pulses from clock 22 being fed to counter 24.

In like manner decision circuit 10 cannot drop more loads than is set by the maximum off switch 104. Thus, if the maximum number of off loads determined by switch 104 is set so that the maximum number of loads to be off at any given time will number five, then if up-down counter 24 decrements to output three a logic zero will output from the nand gate 84 through pole 110 and line 112 to nand gate 31. Nand gate 31 outputs a logic one to nand gate 33 which in turn outputs a logic zero to nand gate 32 to prevent additional "down" pulses from clock 22 being fed to up-down counter 24.

Clock 22 obviously sets the rate at which loads are activated or deactivated. It is also used to initiate the cycler sequence in the cycler shift register 100. At each clock pulse, as for instance each three minutes, the output of nand gate circuit 70 is parallel loaded into cycler shift register 100. The data is then shifted serially in a circle as the last stage output is fed back to the input. The number of serial stages shifted is incremented by one each time the shift opeation is performed until the number of serial shifts equals the total number of outputs being used (this may be varied) at which time the number of serial stages shifted is reset to zero. Thus, the data at the cycler shift register 100 input is cycled around the output and used to drive the connected loads.

Figure 5:
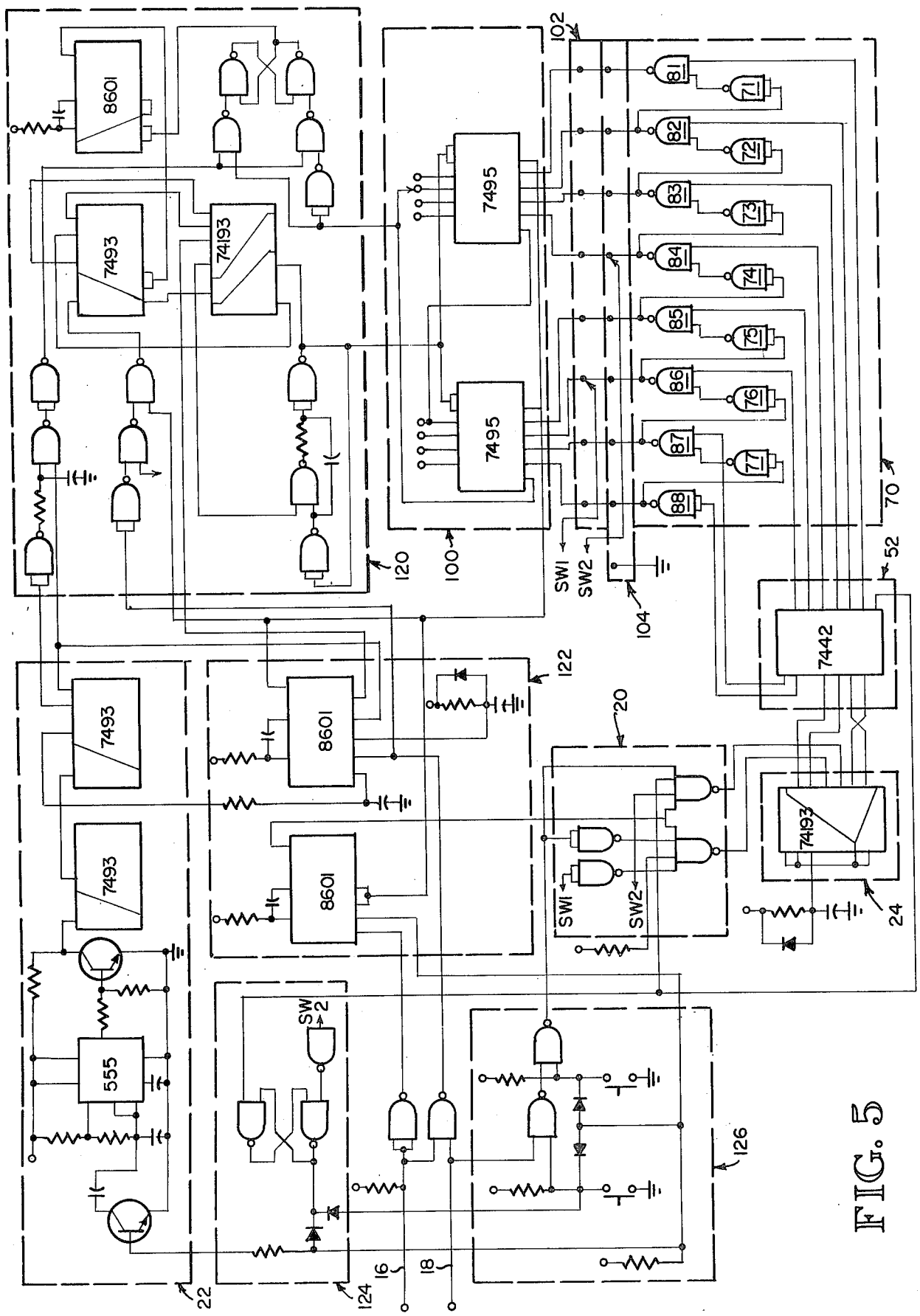
FIG. 5 is a more complete schematic showing additional details of the circuitry supporting the system most clearly depicted in FIG. 2.

FIG. 5 shows additional details of the circuitry embraced by FIG. 2. A cycler control circuit 120 embraced within the blocked space numbered 120 is required to give the parallel load and rotate signals to the cycler shift register 100 each time it receives a pulse from the clock pulse generator 122. The clock pulse generators 122 are used to step the up-down counter 24 and to trigger the cycler control circuit 120. An RC circuit at the input of one of the one shots insures a delayed reset pulse when power is applied to the circuit.

Circuit 124 forces the control to step up at a higher than normal speed when power is first applied to this circuit until it reaches the maximum number of "off" loads. Circuit 126 enables the number of stages off to be increased or decreased manually at a higher than normal speed. This is required when a change is made in the setting of switches 102 or 104.

Figures 3, 4:
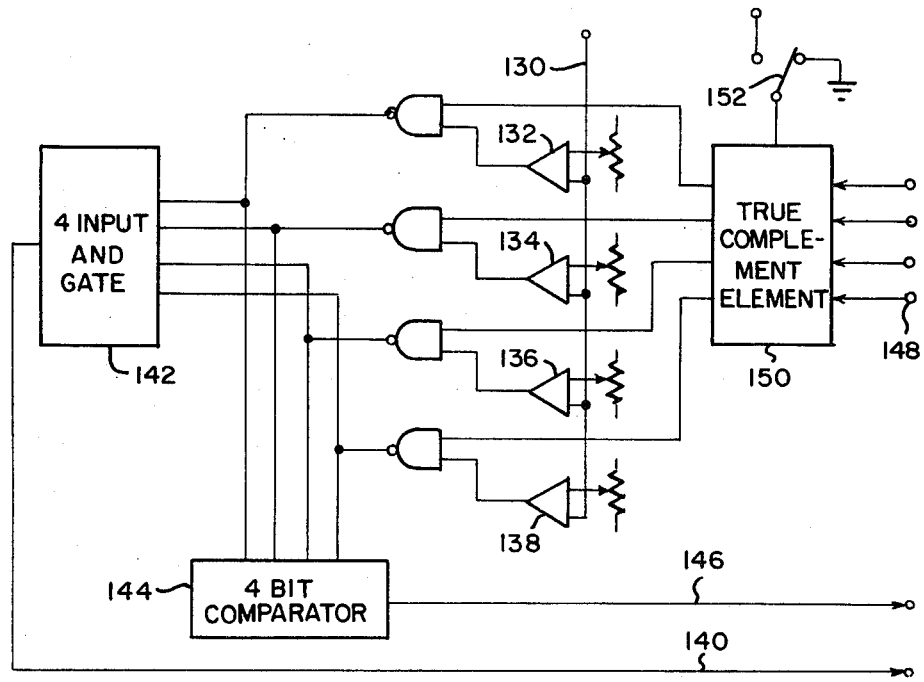
FIG. 3 is a schematic diagram of a circuit which is condition responsive and which represents an alternative form of switch for setting minimum or maximum loads to be turned off in the system.
FIG. 4 is a diagramatic view showing a typical cycling of the system with three loads "off"

FIG. 3 is a schematic and block diagram showing how the manual switch 102 can be replaced by a circuit which is temperature responsive. For instance, a temperature signal is fed into the circuit via line 130 where the temperature signal is compared in comparators 132, 134, 136 and 138. The comparators have temperature set points to define the various temperatures at which the circuit adjusts the number of stages or loads to be held off. It may be decided that the system should operate with four loads off at an outside air temperature 60° F. and three loads off at 70° F and two stages off at 80° F. and one stage off at 90° F. Accordingly, the comparator set points would be so adjusted. When the number of loads "off" equals the number "off" as determined by the comparator whose set point is equal to or the closest under the actual temperature, then the output from gate 142 will inhibit additional "up" counts to up-down counter 24. Should there be insufficient loads off for a certain outside temperature, the condition is detected by the four bit comparator 144 and its output line 146 is used to force the "step-down" signal to up-down counter 24.

It may also be required to rreduce the number of "off" loads as the outside air temperature decreases. Hence, during the heating season the outputs 148 from nand gate circuit 70 are inverted in the true-complement element 150 by switching switch 152 from a "summer" to a "winter" setting.

FIG. 4 is included to show the cycling of the on and off loads by operation of the cycler shift register 100.

What is claimed is:

1. Load control and cycling system for limiting peak electrical load demands and for conserving electrical energy consumption in a multiple load local distribution system, comprising:
    a. means for generating a signal to change the number of loads being energized by said control system,
    b. a control means responsive to signals from said means for generating a signal which commands and enables loads to become energized, de-energized or not changed, and which includes means for producing signal pulses at predetermined intervals,
    c. means responsive to output signal pulses from said control means for periodically cycling the preselected number of energized loads through the total number of controlled loads in said distribution system, and
    d. circuit means operatively connected to said control means including at least one of the switches consisting of (1) a first switch means for selecting the minimum number of loads to be off at any one time and (2) a second switch means for selecting the maximum number of loads to be off at any one time, such that said circuit is able to prevent said control means from adding or dropping loads beyond the maximum and minimum numbers of off loads selected by either of said first and second switches.

2. The load control and cycling system according to claim 1 and in which said circuit means includes both of said first and second switch means.

3. The load control and cycling system according to claim 1 and in which said first and second switch means are manually operable for selection of minimum and maximum number of loads to be off.

4. The load control and cycling system according to claim 1 and in which at least one of said first and second switch means is condition responsive to automatically select the minimum or maximum number of loads to be off.

5. The load control and cycling system according to claim 1 and in which said circuit means includes a gating circuit connected to said means for generating a signal and which gating circuit receives signals from said first and second switch means according to preselected settings thereof to permit or inhibit the control means from changing the number of loads.

6. A load control and cycling system for limiting peak electrical load demands and for conserving electrical energy consumption in a multiple load local distribution system, comprising:
    a. a decision circuit for generating a signal to add, drop or make no change in the number of loads being energized by said control system.
    b. a control circuit responsive to signals from said decision circuit which commands and enables loads to become energized, de-energized or not changed and which includes means for producing signal pulses at predetermined intervals, said control circuit including:
        1. first circuit means for converting said signals to add, drop, or not change loads into binary code output,
        2. second circuit means for decoding said binary code output from said first circuit means and outputing signals to indicate the number of loads to be energized,
        3. third circuit means for enabling the number of loads to become energized which are commanded by the signals from said second circuit means,
        4. fourth circuit means responsive to output signals from said third circuit means for periodically cycling the permitted number of energized loads through the total number of controlled loads in said distribution system, and c. disabling circuit means interconnecting said third circuit means and said first circuit means including at least one of the switches consisting of (1) a first switch for selecting the minimum number of loads to be off at any one time and (2) a second switch means for selecting the maximum number of loads to be off at any one time, such that said disabling circuit is able to prevent said control circuit from adding or dropping loads beyond the minimum and maximum numbers of off loads selected by said first and second switches.

7. The load control and cycling system according to claim 6 and in which said disabling circuit means includes both of said first and second switch means.

8. The load control and cycling system according to claim 6 and in which said first and second switch means are manually operated for selection of minimum and maximum number of loads to be off.

9. The load control and cycling system according to claim 6 and in which at least one of said first and second switch means is condition responsive to automatically select the minimum or maximum number of loads to be off.

10. The load control and cycling system according to claim 6 and in which said disabling circuit means includes a gating circuit connected to said decision circuit and which gating circuit receives signals from said first or second switch means according to preselected settings thereof to permit or inhibit the control circuit from changing the number of loads.

* * * * *